Dec. 19, 1933.　　　L. J. WHITE　　　1,940,639
PRISON LOCKING SYSTEM
Filed Nov. 14, 1932　　　6 Sheets-Sheet 1
Fig.1
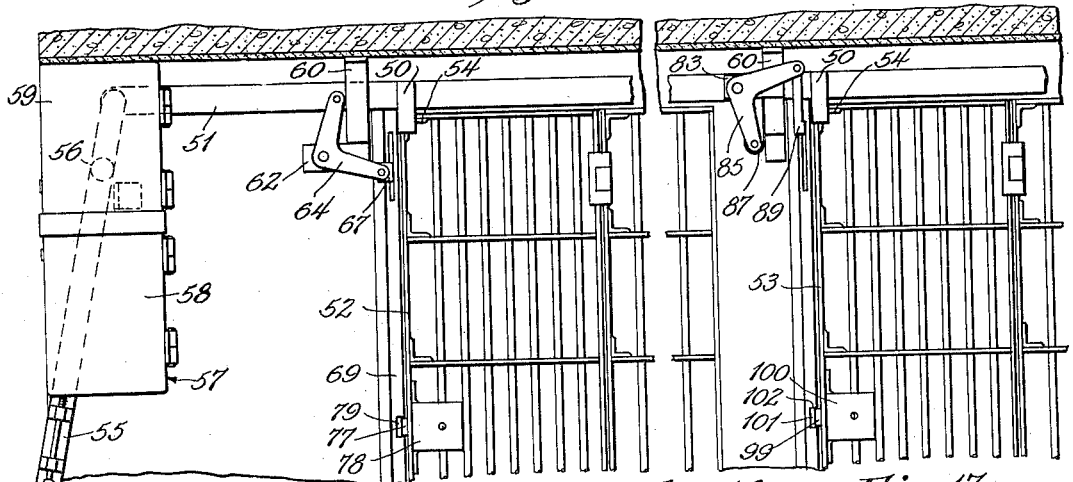
Fig.13　　Fig.14　　Fig.15　　Fig.16　　Fig.17
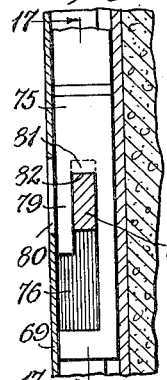 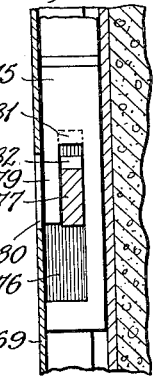 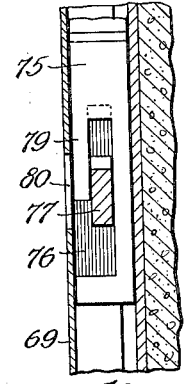 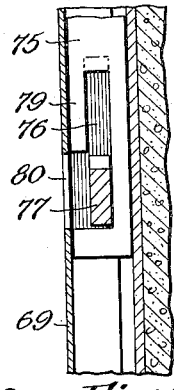 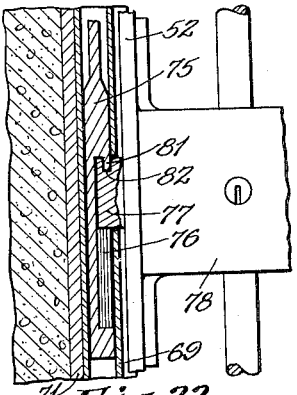
Fig.18　　Fig.19　　Fig.20　　Fig.21　　Fig.22
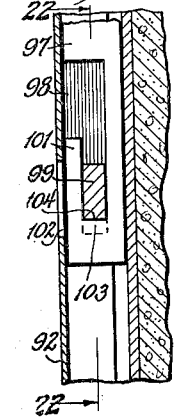 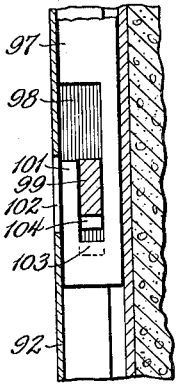 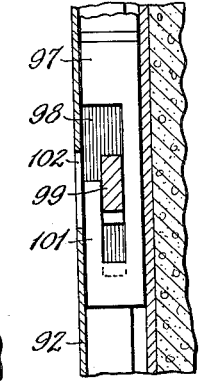 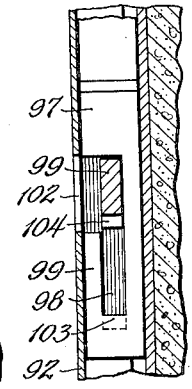 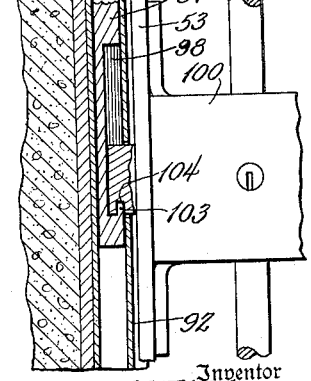
Inventor
L. J. White
By A. D. Adams
Attorney

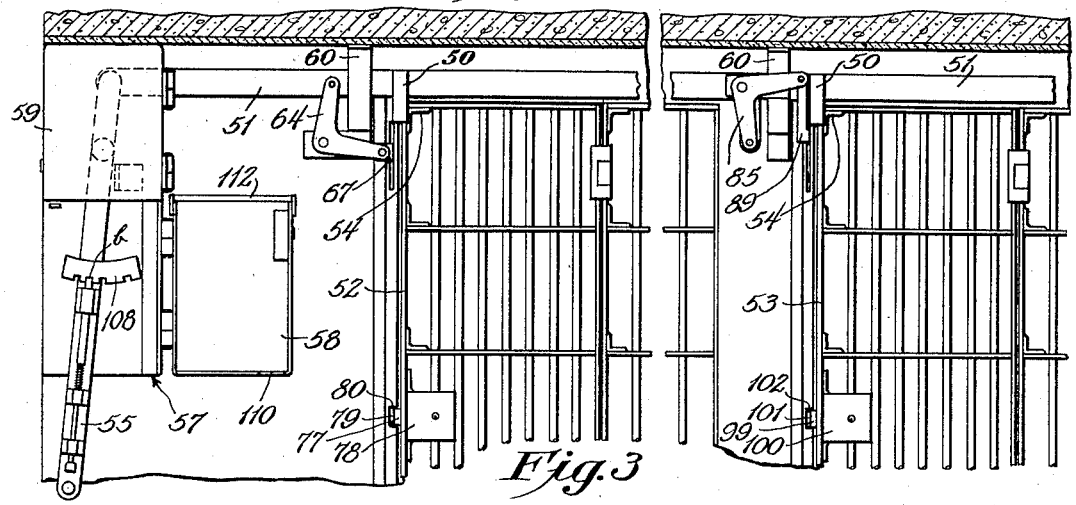
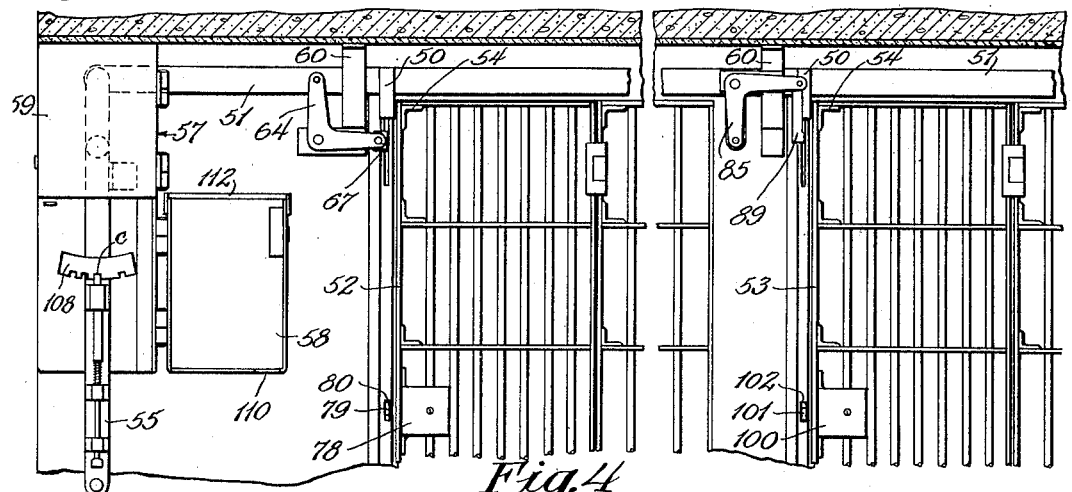
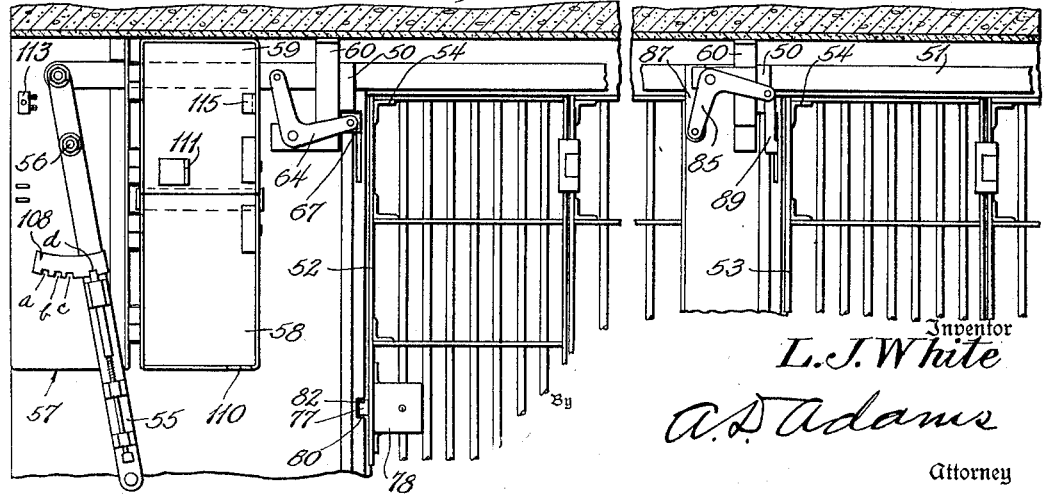

Dec. 19, 1933.    L. J. WHITE    1,940,639
PRISON LOCKING SYSTEM
Filed Nov. 14, 1932    6 Sheets-Sheet 3

Dec. 19, 1933.    L. J. WHITE    1,940,639
PRISON LOCKING SYSTEM
Filed Nov. 14, 1932    6 Sheets-Sheet 4
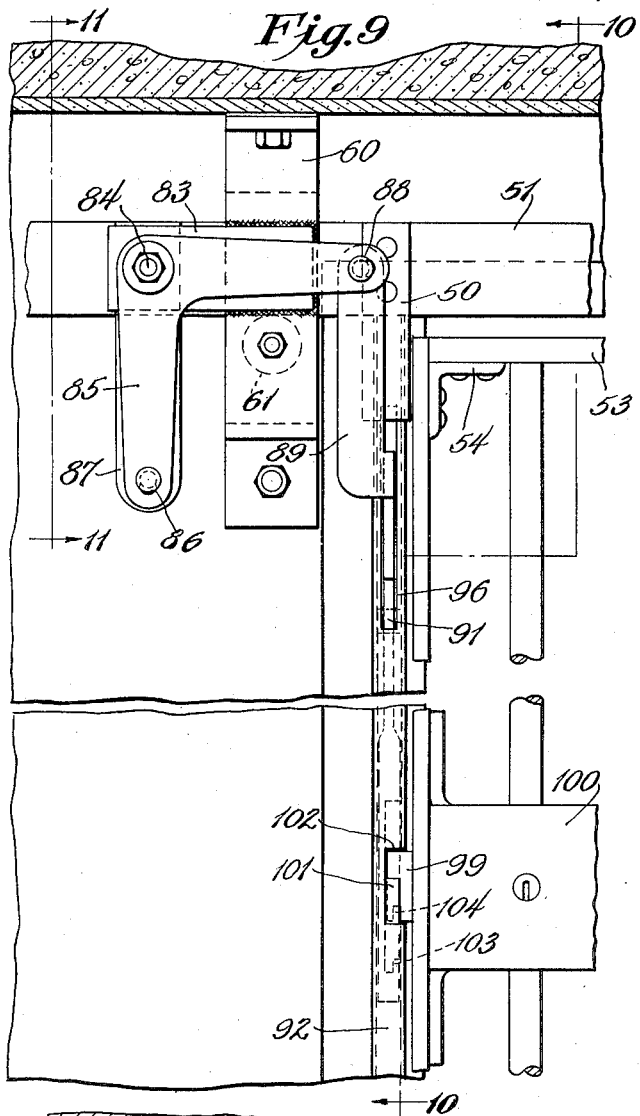
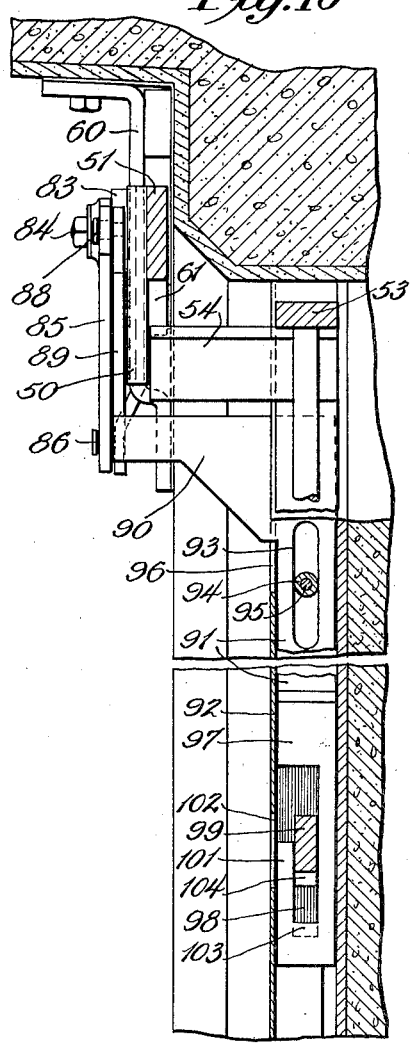
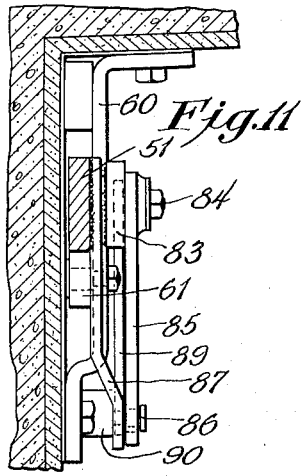
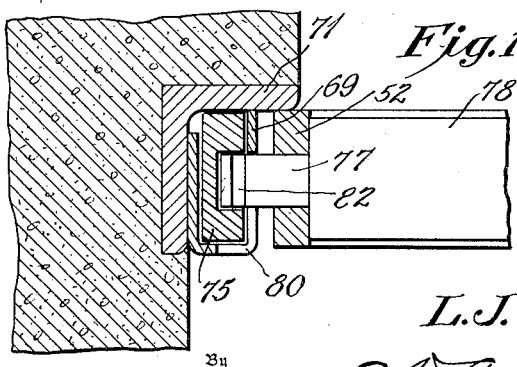
Inventor
L. J. White
A. D. Adams
Attorney Dec. 19, 1933.  L. J. WHITE  1,940,639
PRISON LOCKING SYSTEM
Filed Nov. 14, 1932    6 Sheets-Sheet 5
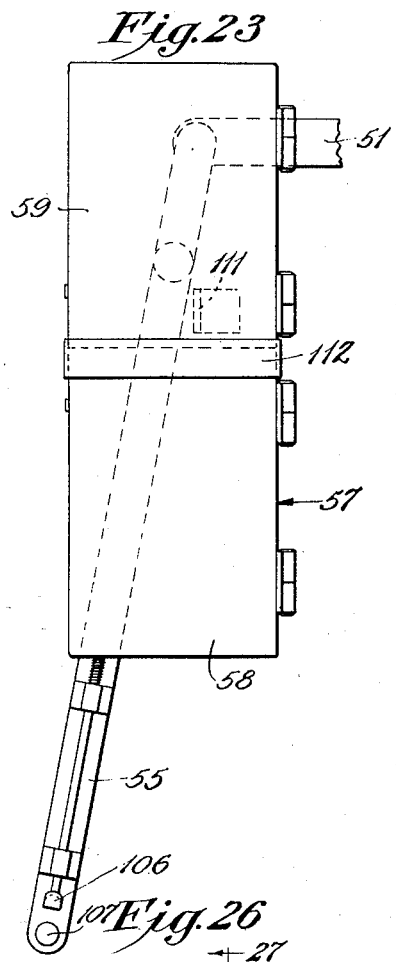
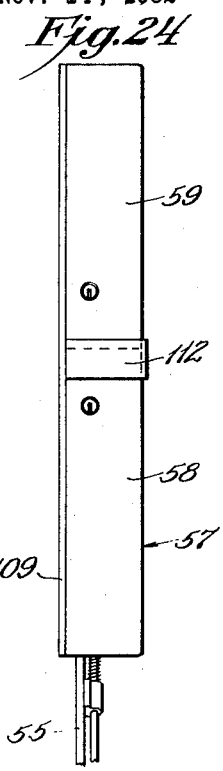
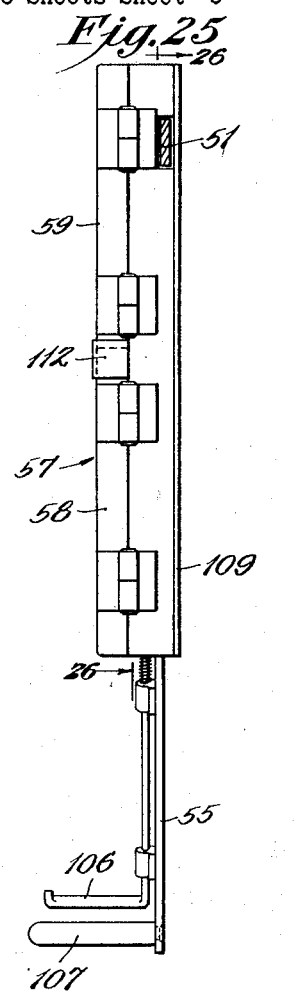
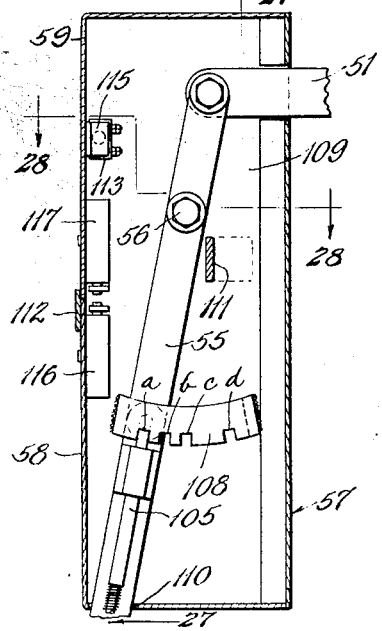
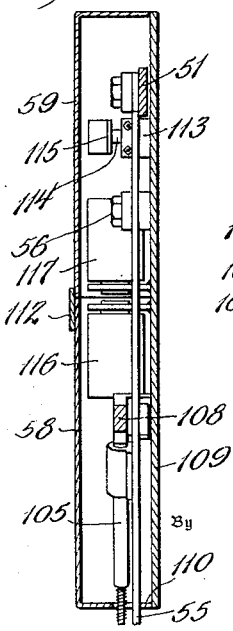
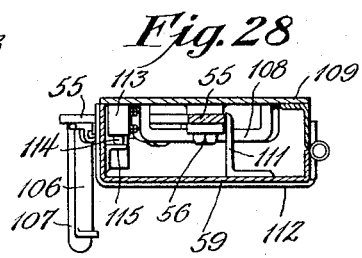
Inventor
L. J. White
A. D. Adams
Attorney Dec. 19, 1933.   L. J. WHITE   1,940,639
PRISON LOCKING SYSTEM
Filed Nov. 14, 1932   6 Sheets-Sheet 6
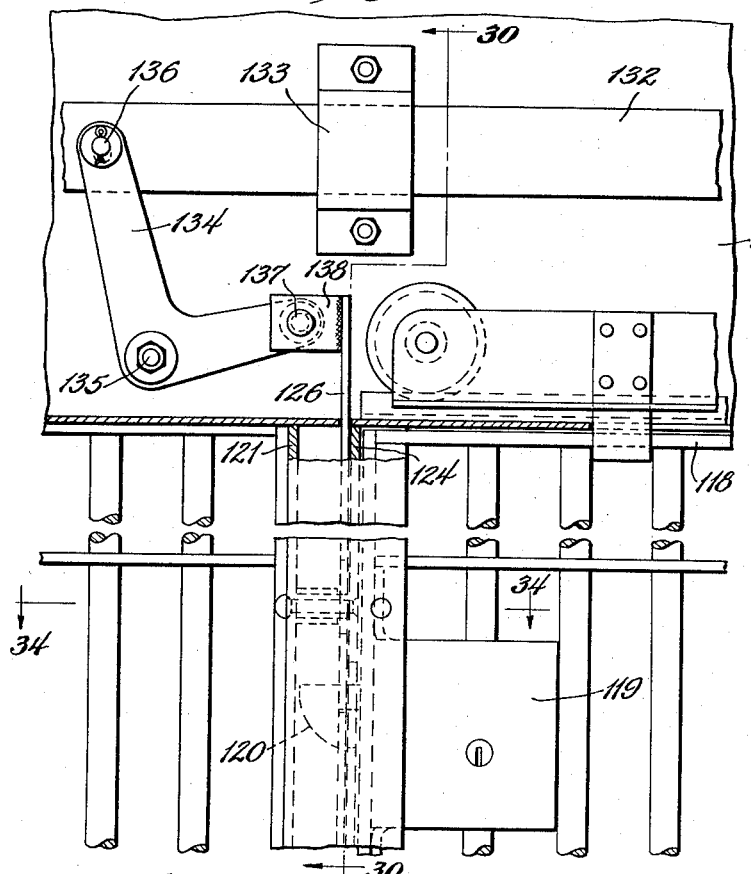
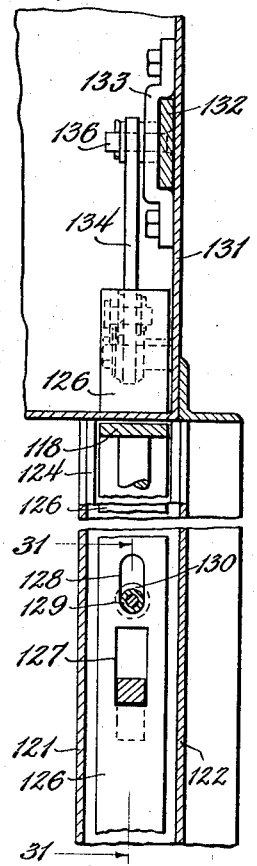
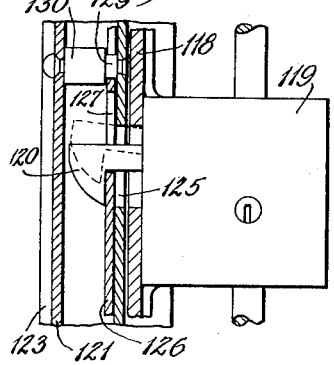
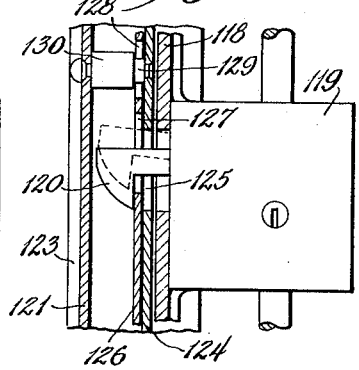
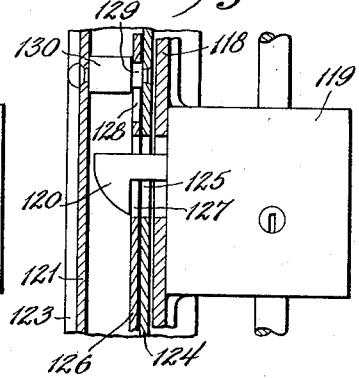
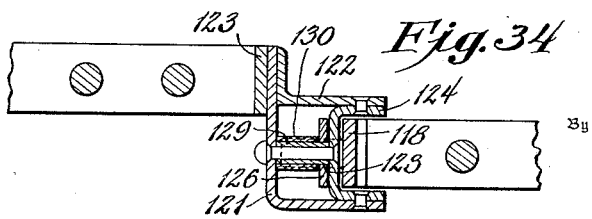

Patented Dec. 19, 1933

1,940,639

UNITED STATES PATENT OFFICE 1,940,639

PRISON LOCKING SYSTEM

Loyd J. White, San Antonio, Tex., assignor to Southern Prison Company, San Antonio, Tex., a corporation of Texas Application November 14, 1932
Serial No. 642,669

16 Claims. (Cl. 189—7)

This invention relates to locking systems of prisons, asylums and the like, wherein the cell doors are provided with individual key-locks and, among other objects, aims to provide greatly improved mechanism whereby all of the key-locked doors may be unlocked simultaneously by a single master operating member in case of an emergency, such as a fire or the like, without the necessity of having a guard enter a corridor to release the indivdual locks. Another aim is to provide associated means whereby the indivdually locked doors may be securely locked so that the locks cannot be picked and cannot be opened without a key. A further and incidental aim is to provide a system wherein a plurality of swinging doors may be held in closed position by a series of individual auxiliary locking or stop members while the key-locks are being locked or unlocked, so that a turnkey or guard may unlock a series of selected doors and leave the prisoners' corridor before the prisoners are released or before they can open the unlocked doors, the idea being to prevent the prisoners from attacking the turnkey before he has locked or unlocked all of the selected doors and reached a point of safety. A still further aim is to provide an improved control cabinet for the master operating mechanism to prevent unauthorized operation of the releasing means and to insure proper sequential operation of the mechanism, the construction being such that the control cabinet can never be closed and locked without first actuating the mechanism to move all of the locks into their non-picking and deadlocked positions.

Other aims and advantages of the invention will appear in the specification, when considered in connection with the accompanying drawings, wherein:

Fig. 1 is a fragmentary elevation, partly in section, showing one form of mechanism embodying the invention applied to a series of swinging doors, the mechanism being so positioned that all of the locks are in their non-pick positions;

Fig. 2 is a similar view showing the mechanism moved to another position wherein the indivdual key locks may be operated by the turnkey;

Fig. 3 is a similar view showing the mechanism moved to a third position wherein the unlocked doors may be opened or closed;

Fig. 4 is a similar view showing the mechanism moved to the emergency lock releasing position so that all of the doors may be opened by the prisoners without actuating the locks;

Fig. 5 is a fragmentary elevation, partly in section, showing the preferred mechanism applied to the lock of one of the doors;

Fig. 6 is a sectional view on the line 6—6 of Fig. 5;

Fig. 7 is a sectional view on the line 7—7 of Fig. 5;

Fig. 8 is a sectional view on the line 8—8 of Fig. 5;

Fig. 9 is another fragmentary elevation, partly in section, showing the preferred form of mechanism applied to the lock of an adjacent swinging door arranged to counter-balance the mechanism shown in Fig. 5;

Fig. 10 is a sectional view on the line 10—10 of Fig. 9;

Fig. 11 is a sectional view on the line 11—11 of Fig. 9;

Fig. 12 is a sectional view on the line 12—12 of Fig. 5;

Figs. 13 to 16 inclusive are vertical sectional views showing the form of keeper and bolt illustrated in Fig. 5, the keeper being moved to its different actuated positions corresponding with those positions of the lever in Figs. 1 to 4 inclusive;

Fig. 17 is a sectional view on the line 17—17 of Fig. 13; showing the non-pick position of the bolt and keeper;

Figs. 18 to 21 inclusive are vertical sectional views showing the form of keeper and bolt illustrated in Fig. 9, the keeper being moved to its different actuated positions corresponding to those positions of the lever in Figs. 1 to 4 inclusive;

Fig. 22 is a section on the line 22—22 of Fig. 18;

Fig. 23 is a side elevation of the preferred form of control cabinet used in connection with the swinging doors shown in Figs. 1 to 4 inclusive;

Fig. 24 is a fragmentary elevation taken at right angles to Fig. 23;

Fig. 25 is an elevation taken on the opposite side of Fig. 23 from Fig. 24;

Fig. 26 is a vertical sectional view on the line 26—26 of Fig. 25;

Fig. 27 is a sectional view on line 27—27 of Fig. 26;

Fig. 28 is a sectional view on the line 28—28 of Fig. 26;

Fig. 29 is a fragmentary elevation, partly in section, showing a modified form of the mechanism applied to one of a series of key-locked sliding doors;

Fig. 30 is a sectional view taken on the line 30—30 of Fig. 29;

Fig. 31 is a sectional view taken on the line 31—31 of Fig. 30 and showing the lock in non-pick position;

Fig. 32 is a similar view showing the parts in position to be unlocked by a key;

Fig. 33 is a similar view showing the parts in emergency release position; and

Fig. 34 is a sectional view taken on the line 34—34 of Fig. 29.

In many old prison installations, the doors are of the swinging type and are individually locked by a key, making it necessary for a turnkey to release the prisoners, one at a time. In some of the installations, there is installed a master-operated, secondary door holding device or auxiliary lock so arranged that the turnkey may move the mechanism to hold the doors in closed position either before or after they are locked or unlocked, the purpose being to prevent the prisoners from attacking the turnkey while he is in the prisoners' corridor and some of the doors are unlocked or before they are locked. However, this auxiliary locking or door holding mechanism is designed merely to insure the safety of the prison attendants. As stated in the objects, it is one of the aims of this invention to provide associated, easily operated, emergency lock releasing mechanism and other improved features to enable a turnkey or attendant to unlock all of the key-locked doors by the same master control lever which operates the auxiliary locking devices. Referring to Figs. 1 to 4, one embodiment of the improved mechanism is shown as being applied to such an installation wherein auxiliary locks in the form of plates 50 are mounted on a horizontal travel bar 51 above a row of swinging doors 52, 53 and engage projecting abutments 54 at the upper free corners of the door frames when the bar is moved in one direction. When the bar is moved in the opposite direction, or to the left as shown, the plates are disengaged from the abutments to permit the doors to be opened.

In this example, the travel bar 51 is shown as being slidably mounted at the front side of a concrete cell wall offset from the plane of the doors, and is operated by a hand lever 55 pivoted at 56 within a control box 57 having a pair of separate doors 58 and 59, the arrangement being such that when the doors are closed the lever must be in its locking position. In many cases, however, the cell walls are not offset and it will be understood that the travel bar will be mounted on such walls nearer the doors and may, if desired, be arranged in a suitable housing.

Referring to Figs. 5 and 7, the travel bar is shown as being confined to reciprocate longitudinally by a series of guides 60 in the form of bent strap metal brackets anchored to the ceiling and cell wall. Each of the guides preferably has a roller 61 to support the bar and reduce friction. One such guide bracket is shown adjacent to the free edge of each door.

On the guide bracket adjacent to the door 52 is welded or otherwise secured a supporting plate 62 carrying a pivot pin 63 for a bell crank 64 having a pin and slot connection 65 between one arm and the travel bar and a pin and slot connection 66 between the other arm and a flanged bracket 67 on the upper end of a vertically reciprocating keeper bar 68. The keeper bar is mounted within a channel-shaped housing 69 preferably secured by bolts 70 to an angle 71, which constitutes the door jamb.

In this example, the keeper bar has vertical slots 72 intermediate its ends guided on sleeves 73 which are mounted on the securing bolts 70. The channel-shaped housing also has a vertical slot 74 at its upper end through which bracket 67 projects, and this slot permits vertical movement of the keeper bar.

The lower end of the keeper bar is enlarged substantially to fill the housing 69 and constitutes a keeper 75 having an L-shaped recess 76 to receive the plunger-type bolt 77 of an ordinary key-lock 78 secured to the door. The arrangement is such that the keeper presents a depending locking finger 79 to engage the front side of the bolt when the keeper bar is in the positions shown in Figs. 13, 14 and 15. The bottom of the recess opens forwardly to release the front side of the bolt when the keeper bar is lifted to the position shown in Fig. 16. Also, the channel-shaped housing 69 has a slot 80 extending partially through one side and the front wall, as clearly shown in Figs. 5 and 12, to permit the bolt to swing through it after the keeper has been raised. The upper end of the recess in the keeper 75 is shown as having a tongue 81 which engages and interlocks with a groove 82 in the upper edge of the bolt 77 to prevent the lock from being picked when the keeper bar is in the position shown in Figs. 13 and 17. In this position, the lock cannot be unlocked by the turnkey but must be released by raising the keeper slightly until the tongue 81 has disengaged the groove 82 in the bolt as indicated in Fig. 14.

Inasmuch as prisons of this type often have as many as 40 or 50 doors in a line to be operated by such mechanisms, it is important that the weight of the keeper bars and operating parts shall not be so great as to require excessive actuating power. To minimize the power required, the vertical keepers and associated parts on alternate doors work in opposite directions and counterbalance each other.

Referring to the operating connections to the keeper bar for the second door 53, it will be noted, as shown in Figs. 9, 10 and 11, that a supporting plate 83 is secured to the guide bracket 60 above the level of the supporting plate 62. This plate likewise carries a pivot pin 84 on which is mounted a bell crank 85 having a pin and slot connection 86 between the end of one arm and a vertical depending plate 87 on the horizontal travel bar. The end of the other arm of the bell crank has a pin and slot connection 88 to a vertical extension 89 on the offset bracket 90 which is connected to the second keeper bar 91.

The keeper bar 91 is mounted in a housing 92 similar to the housing 69 and has a slot 93 which engages a sleeve 94 on a securing bolt 95 for the housing (see the similar construction in Fig. 8). The upper end of the housing has a vertical slot 96 similar to the slot 74 through which the bracket 90 projects. The lower end of the keeper bar has an enlarged keeper 97 similar to the keeper 75. However, this keeper has an inverted L-shaped recess 98 to receive the plunger-type bolt 99 of another key-lock 100 on the door 53. This keeper presents an upstanding locking finger 101 to engage the front side of the bolt when the keeper bar is in the positions shown in Figs. 18, 19 and 20. The upper part of the recess opens forwardly so as to release the front side of the bolt when the keeper bar is lowered to the position shown in Fig. 21. Also, the channel-shaped housing 92 has a slot 102, similar to the slot 80 shown in Figs. 5 and 12, to permit the bolt to swing through it after the keeper has been lowered. The bottom of the recess 98 has a tongue 103 interlocked with a groove 104 in the bottom edge of the bolt 99 when the keeper is in its uppermost position, as shown in Fig. 22. This is the non-pick or deadlocked position of the second lock. It will be seen that the weights of keeper bars and their brackets for adjacent doors tend to move the travel bar 51 in opposite directions because of the arrangement of the bell cranks. Thus, the parts substantially counterbalance each other. Hence, the operating strain on the parts is reduced to a minimum and one attendant can operate any number of locks.

Since all of the keepers are connected to the travel bar, they are actuated simultaneously by the hand lever 55 and may be moved to several selected positions, first, to deadlock all of the doors by positively interlocking all of the keepers with the lock bolts so that the locks cannot be picked or unlocked by a key and, incidentally, to position the auxiliary locks or plates in front of the doors; second, to move the keepers out of interlocking engagement with the bolts so that the locks may be unlocked with a key, the auxiliary locking plates being moved only slightly but still remaining in the path of the doors to prevent them from being opened by the prisoners; third, to move the auxiliary locking plates out of the paths of all doors to permit any unlocked doors to be opened by the prisoners, the keepers in this position being only slightly moved so as to prevent any remaining locked doors from being opened; and fourth, to move all keepers to release or disengage the bolts of all locked doors so that all locked doors may be opened by the prisoners in any emergency, it being understood that the auxiliary locking plates are moved still farther out of the paths of the doors.

To hold the mechanism in the above described positions, the lever is shown as having a spring-urged latch 105 operable by a handgrip 106 adjacent to a handle 107 and this latch engages spaced notches $a$—$b$—$c$—$d$ in a segment 108 secured to the rear wall 109 of the control cabinet. These notches determine the four described positions of the mechanism and of the lever.

Referring to Figs. 23 and 28, the control cabinet is so constructed that its doors cannot be closed without first shifting the lever to its deadlocking position (notch $a$). Also, the lever cannot be shifted to the second and third positions (notches $b$ and $c$) unless the lower door is opened. Further, the arrangement is such that the lever cannot be shifted to the fourth or emergency lock releasing position (notch $d$) without opening both the lower and upper doors in succession. This is to prevent unintentional or unauthorized release of all the prisoners.

In this example, both doors 58 and 59 are hinged on the same side of the cabinet and are flanged to form the front, side, top and bottom walls of the cabinet when they are closed. The bottom flanged wall of the lower door has a notch 110 to accommodate the lever when the lever engages the notch $a$, only. When the lever is in this position, the lower door may be closed and locked closed. This lower door is adapted to be opened to permit the lever to be moved into either of the notches $b$ or $c$. As hereinbefore stated, it is moved to the second position ($b$) to permit the turnkey to unlock the doors and, at the same time, retain the auxiliary locking plates in the paths of the doors so that the prisoners cannot push the doors open before the turnkey has returned to the control cabinet and moved the lever to engage the notch $c$. The lever is limited in its inward movement when the lower door is opened and the upper door is closed, by means of a stop in the form of an angle bracket 111 secured to the inner face of the front wall of the upper door.

To enable the lever to be moved to its emergency releasing position, (notch $d$) it is necessary for the attendant to open the upper door 59. Incidentally, this door cannot be opened without first opening the lower door because the lower door has an upper marginal flange 112 which overlaps the lower edge of the upper door. By opening the upper door, the stop member 111 is moved out of the path of the lever. Then the lever may be pushed to its extreme inner position so as to engage the notch $d$, as shown in Fig. 4. As an added precaution, the cabinet is shown as having an electric switch 113 operated by a spring-urged plunger 114 of common construction adapted to close a signal circuit when the upper door is opened. This circuit may include a visible or audible alarm (not shown) in the office of the warden. The switch is normally held open by means of an abutment or flange 115 secured to the side wall of the upper door and adapted to be moved out of engagement with the plunger when the door is opened. When a signal is given in the warden's office, it is an indication that there is an emergency requiring that the prisoners be released or that some unauthorized person is tampering with the mechanism.

Both of the doors of the control cabinet are adapted to be locked closed to prevent unauthorized operation of the lever 55. They are shown as having separate key locks 116 and 117 preferably adapted to be unlocked by different keys, one idea being to use this as an added precaution to prevent unintentional release of the prisoners.

Reference has already been made to the different positions of the keepers for the first and second doors when the lever is actuated from one extreme to the other. The parts shown in Figs. 13, 14, 15 and 16 are in the positions corresponding with those of the lever in the notches $a$ to $d$, respectively, for the first door. The positions of the parts shown in Figs. 18, 19, 20 and 21 correspond with the same respective positions of the lever for the second door, it being understood that the locking mechanism for the doors alternates throughout the series, as previously explained.

In some of the old installations of sliding doors which are individually locked but have no master operating mechanism, it is desirable to employ emergency lock releasing mechanism of the general type explained in connection with the swinging doors so as to enable prisoners to be released in case of fire, etc. To this end, a modified form of the mechanism is shown as being applied to sliding doors.

Referring to Figs. 29 to 34, inclusive, there is shown a sliding door 118 of the usual construction, having a key lock 119 carrying a pivoted latch bolt 120 also of ordinary construction. The latch bolt is usually arranged to project through an opening in the door jamb and swing into engagement with it when it is locked.

In this example, a special door jamb is provided for the locking edge of each of the sliding doors. The jamb is shown as being formed by a pair of angle members 121 and 122 secured to the jail wall 123 and providing a channel-shaped housing within which is inserted a U-shaped jamb member 124 which partially fills the channel and the forward edge of the door frame is adapted to be seated in the channel. The web of the U-shaped jamb member is provided with a vertical slot 125 to receive the latch bolt 120. The length of this slot is such that the latch bolt clears it when it is either raised or lowered. Also, its upper edge limits the upward swinging movement of the latch as shown in dotted lines in Figs. 31 and 32.

Cooperating with the latch bar is a vertically movable keeper plate or bar 126 having a vertical slot 127 of the same size as the slot 125. This keeper plate is slidably mounted within the housing formed by the memebrs 121, 122 and 124. It is guided to move against the back face of the web of the member 124 by a slot 128 on a rivet sleeve 129 being confined by a spacing washer 130. The upper end of the keeper plate projects through the bottom wall of a casing 131 within which is slidably mounted a travel bar 132 in suitable guides 133 to actuate the several keeper plates or bars.

The travel bar is adapted to be actuated by a lever within a master control box similar to the arrangement shown in connection with the swinging doors. Also, the actuating connections between the keeper plates and the travel bar are somewhat similar to those described in connection with the swinging doors. In Fig. 29, a bell crank 134 is shown as being pivoted at its elbow on a pivot pin 135 mounted within the casing and having a pin and slot connection 136 to the travel bar at the end of one of the arms and a pin and slot connection 137 to a clip or bracket 138 on the upper end of the keeper bar at the end of the other arm. The connections are such that when the travel bar moves to the left, the keeper bar is raised to its deadlocking position, as indicated in Fig. 31, it being understood that the segment for the operating lever will have a notch to hold it in this position.

It will be noted that the lower end of the slot in the keeper plate or bar engages the lower edge of the latch bar behind its locking bill. The bill cannot be raised clear of the lower edge of the slot because it is limited in its upward swinging movement by the upper edge of the slot 125 in the web of the channel-shaped jamb member 124, as indicated in dotted lines in Fig. 31. Thus, the door is deadlocked and the lock can neither be picked nor unlocked by a key.

When the travel bar is moved to the right, the keeper plate is lowered to its next position, being still engaged behind the bill of the latch bar 120 to prevent any door in the line from being pushed open. However, the lower edge of the notch 127 is sufficiently low to permit the bill to clear it when the lock is raised or unlocked by means of a key as shown in dotted lines in Fig. 32. When the travel bar is moved farther to the right, the keeper plate is again lowered below the position shown in Fig. 32, so that the slot 127 registers with the slot 125 and thereby releases the latch bill so that the door may be opened by the prisoners. This is the emergency lock releasing position, and it will be understood that all of the doors in a group or row of cells will be operated simultaneously in this manner. This mechanism requires that the lever which actuates it shall have only three working positions. In other words, only three notches will be required in the locking segment for the lever. These notches will correspond with the notches $a$, $c$ and $d$ in the segment 108 shown in connection with the swinging door installation. The omission of the notch $b$ is made possible because this system has no auxiliary locks for the doors. The sliding doors automatically lock themselves when they are closed, assuming that the keeper plate is in the position shown in Fig. 32.

While the improved mechanisms are designed particularly to effect the emergency release of key-locks and to deadlock all doors, it will be understood that the same mechanism may be employed to lock and release all locks in a row of cells when the prisoners are released in a group. It is contemplated that the turnkey will release and lock the doors in all groups or rows of cells at least once a day, thereby avoiding the necessity of using a key on each lock. This will save considerable time and labor in large prison installations.

From the foregoing description, it will be seen that the simplified mechanism is very easy to install and can be operated by a jail attendant of ordinary intelligence. The apparatus not only enables doors of any type to be more securely locked than is possible with ordinary key locks and insures quick release of all prisoners in case of an emergency. Moreover, it is practically impossible for an attendant to release the prisoners unintentionally and unauthorized persons cannot get access to the operating member. Further, the levers and travel bars may be standardized for all swinging installations because these parts are not subjected to excessive operating strains due to the counterbalancing action of the keepers.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. In a prison having a row of cell doors, individual locks having key-operated bolts secured to the doors; vertically movable keeper members engageable with the bolts of the locks; bolt-engaging members on the keepers positively interlocking with the bolts when the keepers are in one position to deadlock the doors so that they cannot be unlocked without a key; means to release all of the bolts when the keepers are moved to their unlocking position; a master actuating member connected to operate all of the keepers simultaneously, and means to retain said actuating member in either of its keeper operating positions.

2. In a prison or the like having a row of cell doors, individual key-locks secured to the doors; vertically movable keeper members cooperating with the bolts of the locks; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; and a single actuating member connected to actuate all of the keepers simultaneously having means to retain it in its several actuating positions.

3. In a prison or the like having a row of cell doors, individual key-locks secured to the doors; vertically movable keeper members cooperating with the bolts of the locks; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; a travel bar connected to the keepers; a master control cabinet into which the travel bar projects; an operating lever in the control cabinet; a notched segment for the lever whereby it may be moved to any selected operating position; and removable stop means in the cabinet to prevent unintentional lock releasing action of the lever.

4. In a prison or the like having a row of cell doors, individual key-locks secured to the doors; vertically movable keeper members cooperating with the bolts of the locks; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; a travel bar connected to the keepers; a master control cabinet into which the travel bar projects; an operating lever in the control cabinet; a notched segment for the lever whereby it may be moved to any selected operating position; a pair of doors on the cabinet, means on one of the doors coacting with the lever to prevent the lever from being moved out of its deadlocking position until said door is opened; and stop means on the second door coacting with the lever to prevent the lever from being moved to its emergency lock releasing position until said second door is opened.

5. In a prison or the like having a row of cell doors, individual key-locks secured to the doors; vertically movable keeper members cooperating with the bolts of the locks; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; a travel bar connected to the keepers; a master control cabinet into which the travel bar projects; an operating lever in the control cabinet; a notched segment for the lever whereby it may be moved to any selected operating position; a pair of doors on the cabinet; means on one of the doors coacting with the lever to prevent the lever from being moved out of its deadlocking position until said door is opened; stop means on the second door coacting with the lever to prevent the lever from being moved to its emergency lock releasing position until said door is opened; individual locks on each of said cabinet doors; and coacting means on said doors to prevent said second door from being opened until said first door has been opened.

6. In a prison or the like having a row of cell doors, individual key-locks secured to the doors; vertically movable keeper members cooperating with the bolts of the locks; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; a travel bar connected to the keepers; a master control cabinet into which the travel bar projects; an operating lever in the control cabinet; a notched segment for the lever whereby it may be moved to any selected operating position; a pair of doors on the cabinet; means on one of the doors coacting with the lever to prevent the lever from being moved out of its deadlocking position until said door is opened; stop means on the second door coacting with the lever to prevent the lever from being moved to its emergency lock releasing position until said door is opened; individual locks on each of said cabinet doors; coacting means on said doors to prevent said second door from being opened until said first door has been opened; and a switch associated with said second door adapted to close a signal circuit when said door is opened.

7. In a prison or the like having a row of cell doors, individual key-locks secured to the doors; vertically movable keeper members cooperating with the bolts of the locks; means on the keepers to deadlock the bolts when the keepers are in one position; means on the keepers to release all lock bolts when the keepers are moved to another position; a single operating lever connected to actuate all of the keepers; a control cabinet for the lever having a movable stop member coacting with the lever to prevent the lever from being moved to its emergency lock releasing position.

8. In a row of cell doors, individual key-locks secured to the doors; vertically movable slotted keeper members slidably mounted in the door frames and engageable with the bolts of the locks for releasing all of said bolts in an emergency; a horizontal master actuating bar for the keepers; and oppositely movable connecting means on said bar to actuate the keepers so that the keepers of adjacent doors move in opposite directions and counteract the tendency of the keepers to move the bar.

9. In a prison or the like having a row of cell doors, individual key-locks having pivoted bolts secured to the doors; vertically movable slotted keeper members slidably mounted in the door frames and engageable with the bolts of the locks adapted to release all of the lock bolts in an emergency; a master actuating bar for the keepers; and bell cranks connecting all of the keepers to the actuating bar, the bell cranks for the keepers of adjacent doors being mounted to swing in opposite directions so that the keepers are simultaneously moved in opposite directions when actuating movement is imparted to the bar.

10. In combination with a row of swinging cell doors having individual key-locks, a horizontal travel bar having rigidly connected, substantially vertical, auxiliary locking members movable into and out of the paths of movement of the doors incident to the horizontal movement of the travel bar; vertically movable keeper members slidably engaging the key-locks also connected to be actuated by said travel bar and having means to release all of the locks simultaneously; and a master actuating lever connected to said travel bar.

11. In combination with a row of swinging cell doors having individual key-locks, a horizontal travel bar carrying rigidly connected auxiliary lock members movable into and out of the paths of movement of the doors by the horizontal movement of the travel bar; vertically movable keeper members slidably engageable with the lock bolts; interlocking members on the keepers and bolts adapted, in one position, to deadlock all of the doors and, in a second position, partially to release the lock bolts so that the locks may be unlocked with a key, and in a third position, fully to release all of the locks in case of an emergency; and means connecting the keepers to be actuated by said travel bar simultaneously with said auxiliary locks, said auxiliary locks being so located that they remain in the paths of the doors when the keepers are in their partial lock releasing positions and adapted to be moved out of the paths of the doors without fully releasing the keepers from the lock bolts of the remaining closed and locked doors.

12. In a prison or the like having a row of sliding cell doors, individual key-locks on the doors having pivoted bolts; jambs for the doors having elongated vertical slots through which the bolts project, the upper edges of said slots limiting the unlocking pivotal movement of said bolts; movable keeper members housed within the door jambs also having corresponding slots through which the latches are adapted to project; said keeper members in one position interlocking with said latches to deadlock the doors, and in another position partially releasing the latches so that they may be unlocked with a key and, in a final position, fully releasing the latches so that all doors may be opened in an emergency; a single travel bar connected to actuate all of the keepers simultaneously; and a master lever connected to the travel bar.

13. In a prison having a row of swinging cell doors, individual locks on the doors having key-operated bolts; a movable keeper member engageable with each of the bolts adapted in one position to deadlock the doors and, in another position, partially to release the bolts so that the doors may be unlocked with a key; a master actuating member for all of the keepers; an auxiliary stop member carried by the master member adjacent to each door and so arranged are to lie in the path of swinging movement of the door when the master member is moved to the position wherein the keepers permit the doors to be unlocked with a key, said stop members being movable out of the paths of the respective doors after they are unlocked; and a single actuating device connected to said master operating member.

14. In a prison having a row of swinging cell doors, indivdual key-locks on the doors having pivoted bolts; vertically movable keeper members engageable with the bolts; means on the keepers positively interlocking with the bolts when the keepers are in one position to deadlock the doors so that the locks cannot be picked or unlocked with a key; said keepers adapted to be moved to another position permitting the bolts to be unlocked with a key; means on the keepers to release all of the bolts when the keepers are moved to still another position; a travel bar connected to operate the keepers; a plurality of door stop members on the travel bar lying in the paths of the doors to prevent the doors from being opened by prisoners while an attendant is unlocking them, said stop members being adapted to be moved out of the path of the doors after they are unlocked with a key; a master operating lever connected to the travel bar; and a notched segment for the lever whereby it may be moved to any selected operating position.

15. In a prison having a row of swinging cell doors and individual locks on the doors having key-operated bolts, movable keeper bars connected to engage bolts of the locks; a longitudinally movable master bar connected to actuate all of the keeper bars; auxilary locking members mounted on the master bar, each projecting into the path of movement of a door when the keeper bars are in locking engagement with the bolts; said keepers being arranged to be moved to intermediate positions permitting individual doors to be unlocked by a turnkey and said auxiliary locking members being so positioned as to remain in the paths of the doors, to prevent the prisoners from opening their respective doors as they are unlocked; said master bar being adapted to be moved to another intermediate position to move the auxiliary locking members out of the paths of the doors without disengaging the keepers from the bolts of any remaining locked doors; and a manual actuating device connected to said master bar.

16. In a master locking system for a series of doors, a travel bar; keeper bars for the doors connected to the travel bar; indivdual key-locks on the doors engagable with the keeper bars and adapted to be unlocked by a turnkey when the keeper bars are in one intermediate position; and auxiliary locking plates projected from and rigdly secured to the travel bar and so positioned as to hold the unlocked doors closed until the travel bar is moved to another intermediate position.

L. J. WHITE.

CERTIFICATE OF CORRECTION.

Patent No. 1,940,639.                                              December 19, 1933.

LOYD J. WHITE.

It is hereby certified that error appears in the printed specification of the above numbered patent requiring correction as follows: Page 4, line 133, claim 1, for the word "without" read with; and that the said Letters Patent should be read with this correction therein that the same may conform to the record of the case in the Patent Office.

Signed and sealed this 20th day of July, A. D. 1937.

(Seal)

Henry Van Arsdale
Acting Commissioner of Patents.